US012735181B2

(12) United States Patent
Pushp

(10) Patent No.: US 12,735,181 B2
(45) Date of Patent: Sep. 15, 2026

(54) BLENDED WING BODY TAILSITTER UAV

(71) Applicant: AIRBOUND INTERNATIONAL INC., Wilmington, DE (US)

(72) Inventor: Naman Pushp, Bangalore (IN)

(73) Assignee: Airbound International Inc., Wilmington, DE (US)

( * ) Notice: Subject to any disclaimer, the term of this patent is extended or adjusted under 35 U.S.C. 154(b) by 0 days.

(21) Appl. No.: 18/436,351

(22) Filed: Feb. 8, 2024

(65) Prior Publication Data

US 2025/0010988 A1 Jan. 9, 2025

Related U.S. Application Data

(60) Provisional application No. 63/443,981, filed on Feb. 8, 2023.

(51) Int. Cl.

| | |
|---|---|
| ***B64C 29/02*** | (2006.01) |
| ***B64C 39/10*** | (2006.01) |
| ***B64U 10/20*** | (2023.01) |

(52) U.S. Cl.
CPC .............. *B64C 29/02* (2013.01); *B64C 39/10* (2013.01); *B64U 10/20* (2023.01); *B64C 2039/105* (2013.01)

(58) Field of Classification Search
CPC .... B64C 29/02; B64C 39/10; B64C 2039/105
See application file for complete search history.

(56) References Cited

U.S. PATENT DOCUMENTS

| | | | | |
|---|---|---|---|---|
| 2,846,164 | A * | 8/1958 | Haberkorn | B64C 39/062 244/100 R |
| 3,576,300 | A * | 4/1971 | Palfreyman | B64D 27/20 244/1 N |
| 4,969,614 | A * | 11/1990 | Capuani | B64C 39/10 244/12.3 |
| 9,452,825 | B2 * | 9/2016 | Witte | B64C 5/08 |
| 10,040,547 | B1 * | 8/2018 | Pedigo | B64C 29/0025 |
| 11,697,507 | B1 * | 7/2023 | Kawai | F17C 1/12 244/135 R |

(Continued)

FOREIGN PATENT DOCUMENTS

| | | | | |
|---|---|---|---|---|
| KR | 20220011829 A | * 2/2022 | | B64C 29/02 |
| KR | 20220045596 A | * 4/2022 | | B64U 50/14 |

OTHER PUBLICATIONS

Translation of KR-20220011829-A (Year: 2022).*

(Continued)

*Primary Examiner* — William L Gmoser
(74) *Attorney, Agent, or Firm* — Knobbe, Martens, Olson & Bear, LLP

(57) ABSTRACT

The present disclosure relates to an aircraft including two or more propulsive devices, and a fuselage integrated with a pair of wings to create a Blended Wing Body (BWB) structure, wherein an orientation of the fuselage and the pair of wings change based on a transition of the aircraft from a vertical position to a horizontal position. Further, each wing of the pair of wings includes a lower winglet and an upper winglet that are identical and coupled to each other at a wing tip. The aircraft further includes a plurality of elevons controlled by two or more propellers associated with the two or more propulsive devices.

20 Claims, 7 Drawing Sheets

(56) References Cited

U.S. PATENT DOCUMENTS

| | | | | |
|---|---|---|---|---|
| 2017/0233070 | A1* | 8/2017 | Starace | G05D 1/0858 244/7 B |
| 2018/0141655 | A1* | 5/2018 | Wall | B64C 29/02 |
| 2018/0244383 | A1* | 8/2018 | Valente | B64C 11/46 |
| 2019/0300153 | A1* | 10/2019 | Warner | B64C 29/02 |
| 2021/0122468 | A1* | 4/2021 | Morris | B64C 1/1415 |
| 2022/0324561 | A1* | 10/2022 | Abbott | B64C 29/02 |

OTHER PUBLICATIONS

Translation of KR 20220045596 (Year: 2022).*
Liebeck et al., "Blended-Wing-Body Subsonic Commercial Transport" AIAA 98-0438 (1998).
Rocha, "Longitudinal Control of a Tail-Sitter UAV" Tecnico Lisboa (2022).
Jiang et al., "Hybrid Aerodynamics-Based Model Predictive Control for a Tail-Sitter UAV" (2023).

* cited by examiner

BLENDED WING BODY TAILSITTER UAV

PRIORITY INFORMATION

The present application claims the benefit of U.S. Provisional Application No. 63/443,981, filed Feb. 8, 2023, the entirety of which is incorporated herein by reference.

TECHNICAL FIELD

The present subject matter described herein, in general, relates to aerial vehicles and, more particularly, an Unmanned Aerial Vehicle (UAV) featuring a Blended Wing Body (BWB) configuration designed to operate as a tailsitter.

BACKGROUND

The advancement of Vertical Takeoff and Landing (VTOL) aircraft, specifically those equipped with tailsitter configurations, has been motivated by the imperative to tackle substantial obstacles in providing critical services, especially in rural areas with sparse populations. Prevalent drone delivery systems in these regions are severely dependent on infrastructure, which poses a considerable barrier to their feasibility. The issue of extensive infrastructure becomes especially problematic when lengthy delivery ranges are considered, as critical locations such as hospitals and blood banks are separated by up to 100 kilometers.

The difficulties are increased by the requirement for a minimum payload capacity of 1 kilogram in order to carry fully insulated blood packages, which is an essential factor to bear in mind when conducting medical deliveries. Presently, the delivery range and payload capacity of existing drone technologies are constrained, which renders them unsuitable for fulfilling the requirements of medical supply transportation in rural environments.

Further compounded by the obstacles presented by inadequate infrastructure, specifically in rural regions of developing or underdeveloped nations, there is an even greater imperative for efficient transportation of medical supplies. A considerable proportion of the populace inhabiting these rural regions encounters substantial barriers in their pursuit of essential services. Due to inadequate infrastructure, the cost of delivering critical supplies, such as blood, frequently exceeds the actual cost of the supplies in the context of medical emergencies.

The concept of Tailsitter aircraft presents an intriguing potential solution to these challenges. However, widespread adoption of Tailsitters faces resistance due to the inherent design complexity. Tailsitters, especially as weight increases, become exceptionally challenging to stabilize, making their implementation in practical scenarios a complex endeavor.

While drones hold promise for delivery in such regions, the current limitations of existing drone models hinder their ability to provide a cost-effective solution for longer delivery distances and higher payload capacities. For instance, drones with extensive delivery ranges, around 160 km, incur high infrastructure costs. Conversely, drones with simpler designs may offer a lower delivery range or limited payload capacity. This disparity highlights the urgent need for a drone model that can address these challenges by supporting longer delivery ranges, increased payload capacities, and reduced infrastructure costs.

SUMMARY

Before the present system(s) and method(s) are described, it is to be understood that this application is not limited to the particular system(s), and methodologies described, as there can be multiple possible embodiments that are not expressly illustrated in the present disclosures. It is also to be understood that the terminology used in the description is for the purpose of describing the particular implementations or versions or embodiments only and is not intended to limit the scope of the present application. This summary is provided to introduce aspects related to a Blended Wing Body (BWB) tailsitter Unmanned Aerial Vehicle (UAV). This summary is not intended to identify essential features of the claimed subject matter, nor is it intended for use in determining or limiting the scope of the claimed subject matter.

In one aspect, the present disclosure relates to an aircraft comprising an airframe. The airframe includes two or more propulsive devices and a fuselage. The fuselage may be integrated with a pair of wings to create a Blended Wing Body (BWB) structure. The airframe transitions in flight between a vertical flight mode and a horizontal flight mode. In other words, an orientation of the fuselage and the pair of wings change based on a transition of the aircraft from a vertical position to a horizontal position. Further, the pair of wings may comprise split scimitar wings and, more particularly, symmetrical split scimitar wings.

In some embodiments, a wing of the pair of wings includes a lower winglet and an upper winglet. The lower winglet and the upper winglet may be identical. Further, the lower winglet may be attached to the upper winglet at a tip of the wing. In some embodiments, the lower winglet and the upper winglet may carry at least sixty percent of a total weight of the aircraft when the aircraft is in the vertical position.

The aircraft further may include at least two or more propellers and a plurality of elevons. It may be noted that rotations of the propellers control the plurality of elevons to generate a thrust vector required for maintaining a stability of the aircraft and transitioning the aircraft from the vertical position to the horizontal position. In some embodiments, the rotation of the propellers may be based on an operation of a torque multiplier, wherein the torque multiplier is controlled by one or more servo motors.

The aircraft further includes a pair of flaps coupled to the fuselage. The pair of flaps may be designed to facilitate at least one of take-off, landing, cargo securement, and release operations. Further, the pair of flaps exhibits two positions: an extended position and a retracted position.

In some embodiments, the pair of flaps may be configured to be in the retracted position during take-off and landing, ensuring ground clearance during landing and maintaining a spaced-apart position to prevent contact between the flaps.

In some embodiments, the pair of flaps may be configured to be in the extended position when the aircraft is in the horizontal position. Further, when the pair of flaps are in the extended position, the pair of flaps protrudes longitudinally beyond a chord of the pair of wings and winglets. The extended and retracted positioning of the pair of flaps may be controlled by a linkage connected to a servo motor.

In some embodiments, the aircraft is further configured to function as a tailsitter during vertical take-off and landing. The aircraft is further configured to transition from a tailsitter configuration to the horizontal position for a flight.

In another aspect, the present disclosure relates to an airframe for an aircraft. The airframe includes a fuselage integrated with a pair of wings to create a Blended Wing Body (BWB) structure, a pair of flaps coupled to the fuselage, and two or more propellers. The airframe further includes a plurality of elevons coupled to the airframe.

In some embodiments, the airframe may be constructed using a composite monocoque. This construction involves the use of fiber-reinforced plastic (FRP) materials such as carbon fiber, aramid, or fiberglass embedded within a resin matrix. The composite monocoque is further strengthened by an internal structure that includes ribs and spars, contributing to an enhanced level of rigidity. Additionally, specific segments of the monocoque or the internal structure may be manufactured using sandwich panels, featuring a lightweight core and rigid panels on one or both sides of the core. This construction approach ensures a robust and lightweight airframe, combining the advantages of composite materials with strategic structural reinforcement.

BRIEF DESCRIPTION OF THE DRAWINGS

The foregoing detailed description of embodiments is better understood when read in conjunction with the appended drawings. For the purpose of illustrating the present subject matter, an example of a construction of the present subject matter is provided as figures, however, the invention is not limited to the specifics of a Blended Wing Body (BWB) tailsitter Unmanned Aerial Vehicle (UAV) as disclosed in the document and the figures.

The present subject matter is described in detail with reference to the accompanying figures. In the figures, the left-most digit(s) of a reference number identifies the figures in which the reference number first appears. The same numbers are used throughout the drawings to refer to various features of the present subject matter. Components in the drawings are not necessarily to scale, emphasis instead being placed upon clearly illustrating the principles of the present invention.

Figure 1A:
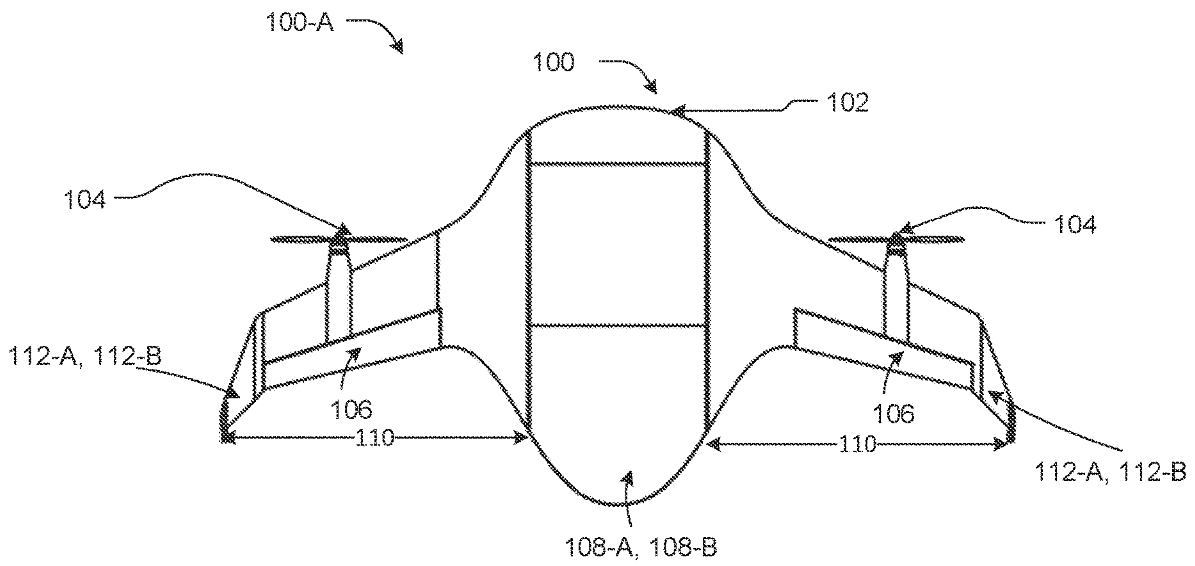
FIG. 1A illustrates a front view of a BWB tailsitter UAV with flaps closed (extended), in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. It must be noted that as used herein and in the appended claims, the singular forms "a," "an," and "the" include plural references unless the context clearly dictates otherwise. Although any system similar or equivalent to those described herein can be used in the practice or testing of embodiments of the present disclosure, the exemplary system is now described.

The disclosed embodiments are merely examples of the disclosure, which may be embodied in various forms. Various modifications to the embodiment will be readily apparent to those skilled in the art, and the generic principles herein may be applied to other embodiments. However, one of the ordinary skills in the art will readily recognize that the present disclosure is not intended to be limited to the embodiments described but is to be accorded the widest scope consistent with the principles and features described herein.

The present subject matter discloses a Blended Wing Body (BWB) tailsitter Unmanned Aerial Vehicle (UAV). The design of the BWB tailsitter UAV comprises adapting a blended wing body (BWB) frame for a tailsitter aircraft. The BWB frame includes a fuselage and a pair of wings. The fuselage is blended with the pair of wings such that there is no clear distinct division between the fuselage and the wings. In other words, the fuselage and the wings are integrated seamlessly to form the BWB frame. The advantage of the BWB frame is that it provides better fuel efficiency than a traditional tube-and-wing aircraft. In an aircraft with a BWB frame, where the fuselage, defined as the central fifty percentage of the body, generates over half the lift of the aircraft in forward flight, thereby, aligning the lift distribution with the weight distribution to eliminate wing bending forces experienced by the aircraft. The resulting reduction in wing bending forces allows the aircraft to achieve longer flight distances, thereby enhancing delivery ranges.

A tailsitter is an aircraft capable of vertical takeoff that transitions its entire body from a vertical position to a horizontal orientation for flight. In a tailsitter aircraft, the entire airframe rotates in flight to switch between a vertical and horizontal flight mode. In other words, the fuselage and wings simultaneously transition from a vertical position to a horizontal position. In traditional VTOL aircraft, the fuselage is horizontally oriented, and only the take-off and landing are vertical. In a tailsitter, the orientation of the entire fuselage, along with the wings, changes between the take-off position and flight. Hence, tailsitters do not require the complex and heavy transition mechanisms used by other types of hybrid fixed-wing/VTOL UAVs, allowing them to fly long distances efficiently with a reduced number of landings. Furthermore, tailsitters can reach higher altitudes compared to basic rotary-wing UAVs, making them best suited for longer delivery ranges at higher altitudes. However, tailsitters pose challenges with respect to stability. Achieving high stability may be accomplished with a lighter frame structure.

To overcome the above challenges posed by the tailsitter aircraft, the present disclosure provides a solution by combining the BWB frame structure with the tailsitter. The Blended Wing Body (BWB) frame structure is a design concept for aircraft that combines the fuselage and wings into a unified, smoothly blended shape. Unlike traditional aircraft, where the wings are attached to a distinct fuselage, the BWB integrates the wings and fuselage into a single aerodynamic structure. The resulting design resembles a flying wing with a broader, more blended shape.

The BWB frame structure enables the use of fewer components for flying, thereby creating a lightweight frame structure. When this lightweight BWB frame structure is combined with the tailsitter configuration, it results in a highly stable aircraft capable of operating over longer delivery ranges. Further, the present disclosure provides a reflex at a trailing edge of the BWB frame to provide a small amount of negative lift for maintaining the stability of the aircraft during the flight. The absence of the regular aircraft tail for providing stability in the tailsitter aircraft is compensated by the reflex. Therefore, the BWB frame structure, when combined with the operation capabilities of the tailsitter, provides a highly efficient BWB tailsitter UAV capable of serving longer delivery ranges.

The airframe is the structural component of the aircraft that supports the load during flight and on the ground. It forms the basic structure of the aircraft and includes the wings, fuselage, elevons, and winglets. The aircraft comprises an airframe, electronics module, navigation systems, and other systems required for flight.

In accordance with some embodiments of the present disclosure, the BWB tailsitter UAV comprises an airframe. The airframe may include a pair of wings, a pair of flaps, a plurality of elevons, two or more propulsive devices, and electronic modules for controlling the operation of the BWB tailsitter UAV.

In accordance with some embodiments of the present disclosure, the pair of wings includes symmetrical split scimitar wings. Each wing of the pair of wings includes identical upper and lower winglets. The upper winglet is coupled to the lower winglet at a wing tip. The winglets of the symmetrical split scimitar wings are designed to support a majority of the weight of the BWB tailsitter UAV during a take-off and landing process i.e., when the BWB tailsitter UAV is in the vertical position, the winglets support most of the weight of the BWB tailsitter UAV. For instance, the winglets are capable of supporting at least sixty percent of the BWB tailsitter UAV's weight during the vertical take-off and landing process. Additionally, the winglets serve a dual purpose by functioning as landing gear, facilitating safe landings of the BWB tailsitter UAV, and reducing air drag experienced by the BWB tailsitter UAV during a horizontal flight. It may be noted that the split scimitar wings enhance the aerodynamic efficiency of the aircraft while maintaining structural integrity.

In an alternate embodiment, the pair of wings may comprise specialized winglets. These winglets are designed with the specific functionality that allows the aircraft to land on them. The specialized winglets are designed with additional structural reinforcement and a flat or extended surface that allows the aircraft to make ground contact during landing. The concept is to provide extra support during the landing process, essentially using the winglets as an extension of the landing gear.

In accordance with some embodiments of the present disclosure, the BWB tailsitter UAV includes a pair of flaps. The pair of flaps supports the BWB tailsitter UAV during take-off and landing processes and also for securing and releasing cargo. The pair of flaps may also be configured to provide support during a horizontal flight of the BWB tailsitter UAV. The pair of flaps are attached to the BWB frame and are open or retracted during an initial take-off to provide stability for the BWB tailsitter UAV. Following take off, the flaps close before transitioning to the horizontal flight mode. In some embodiments, the flaps may remain open during the horizontal flight to provide stability to the BWB tailsitter UAV during heavy wind flow. Further, the flaps may open during the landing process. The open flaps serve as landing gear for the BWB tailsitter UAV providing ground clearance during landing. The flaps may also be used for the loading and unloading of the payload. The flaps open out to enable securing the payload inside the BWB frame and releasing the payload at a destination.

In an alternate embodiment, the pair of flaps may be designed to offer support to the aircraft when the aircraft is in the vertical position. These flaps are configured to contribute to lifting some of the aircraft's weight, working in conjunction with the pair of winglets.

In accordance with some embodiments of the present disclosure, the BWB tailsitter UAV may include a plurality of elevons arranged on the pair of wings to provide pitch and roll control for the BWB tailsitter UAV. Elevons, in general, combine the functionality of an elevator providing pitch control and an aileron providing roll control. The BWB frame further includes a propulsive device or propulsive system with at least a pair of propellers to provide the necessary thrust needed for the BWB tailsitter UAV for the flight.

The propulsive device may comprise at least one of: propellers and a motor. The propellers may comprise a plurality of blades that rotate to generate thrust through the air.

In an embodiment, the propulsive device may be a vectored propulsion system. Rotations of the vectored propulsion system may augment the plurality of elevons to generate a restoring moment for stability in horizontal and vertical flight modes and during transitions between vertical and horizontal positions. The vectored propulsion system may utilize control linkages to multiply the torque provided by actuators.

In certain embodiments, the rotations of the propellers may be utilized to control the plurality of elevons, generating either a thrust vector or a restoring moment as required by the BWB tailsitter UAV. The generated thrust vector may enable the transitioning of the BWB tailsitter UAV from a vertical take-off position to a horizontal flight position and from the horizontal flight position to a vertical flight or landing position. In some embodiments, the propulsive device or the propulsive system includes a torque multiplier providing the needed torque to rotate the propellers, thereby controlling the operation of the elevons. The torque multiplier may be controlled by one or more servo motors.

Various embodiments of the present disclosure will be explained with reference to FIGS. 1A-3.

FIG. 1A illustrates a front view 100-A of a blended wing body (BWB) tailsitter UAV with flaps closed (extended), in accordance with an embodiment of the present subject matter.

Referring to FIG. 1A, an aircraft 100 or the BWB tailsitter UAV 100 or the UAV 100 with a fuselage 102, a pair of propellers 104, a plurality of elevons 106, a pair of flaps 108-A and 108-B, and a pair of wings 110, and a pair of winglets 112A and 112B is shown. The fuselage 102 is integrated with the pair of wings 110 to form a BWB frame such that there is no clear dividing line between the fuselage 102 and the pair of wings 110. The BWB frame has the following advantages: 1. Over fifty percent of the flight lift is generated from the center of the body, 2. the absence of conventional wing body junction provides reduced wetted area and thereby a reduced form drag.

In some embodiments, the BWB frame may include a wide airfoil-shaped body. The wide airfoil-shaped body may enable the entire UAV 100 or the aircraft 100 to generate the needed lift for the flight, thereby providing aerodynamic efficiency by allowing reduced wing size for maintaining effective lift distribution. The reduced wing size provides a lift distribution similar to the ideal elliptical lift distribution and thereby enables reducing the air drag on the wings.

In an embodiment, the fuselage may have at least one of elliptical, an oval, or a belly-shaped structure. This design enhances aerodynamic efficiency and fuel economy by reducing drag.

Referring to FIG. 1A, the pair of propellers 104 may provide lift during horizontal and vertical flight, control the airflow to the plurality of elevons 106, and provide yaw and differential thrust in both vertical and horizontal flight. In some embodiments, the aircraft 100 may include the propulsive device with an electric propulsion system for controlling the operation of the propellers 104 and thereby control the operation of the plurality of elevons 106. The rotations created by the electric propulsion system control the plurality of elevons 106 to generate a thrust vector required for maintaining a stability of the aircraft or the UAV 100 and transitioning the UAV 100 from the vertical position to the horizontal position.

In some embodiments, the electric propulsion system may include a torque multiplier for generating a torque needed for rotating the propellers 104. The rotation of the propellers 104 controls the movement of the plurality of elevons 106 to generate the required thrust vector. In some embodiments, the torque multiplier may be controlled by one or more servo motors. Referring to FIG. 1A, the propellers 104 may include such as, but not limited to, fixed pitch propellers, variable pitch propellers, self-tightening propellers, counter rotating propellers, and folding propellers. In an example embodiment, the length of the propellers 104 may vary between 10-20 inches and may be powered by a motor with a rating in the range of 400-600 Kilovolts. In some embodiments, the UAV 100 may include more than two propellers 104 for generating the required lift.

Referring to FIG. 1A, the elevons 106 or tailerons are a combination of elevators used for pitch control and ailerons used for roll control. In some embodiments, elevons 106 may be installed at the trailing edge of the wings 110. The elevons 106 when moved in the same direction (either up or down) create a pitching force, for example, nose up or nose down, that may be applied to the BWB frame. On the other hand, when the elevons 106 are moved differentially (i.e., one up, one down), they create a rolling force to be applied to the BWB frame. In some embodiments, the elevons 106 are controlled by the propulsive device to generate the thrust vectoring needed for the UAV 100 to fly and also enables transitioning of the UAV 100 from a vertical position to a horizontal position.

Referring to FIG. 1A, a pair of flaps or cargo flaps or flaps 108-A, 108-B is coupled to the fuselage 102 and is designed to facilitate take-off, landing, cargo securement, and cargo release operation. In some embodiments, the pair of flaps 108-A, 108-B is configured to be in the retracted or open position during take-off and landing, ensuring stability during take-off and ground clearance during landing. Further, the pair of flaps 108-A, 108-B maintain a spaced-apart position to prevent contact between the flaps 108-A, 108-B during landing. The opening of the pair of flaps 108-A, 108-B during take-off enables reducing the surface area of the drone or UAV 100 that is being affected by wind during a vertical flight. The opening of the pair of flaps 108-A, 108-B during landing enables the UAV 100 to land with reduced winglets sizes.

Figure 1B:
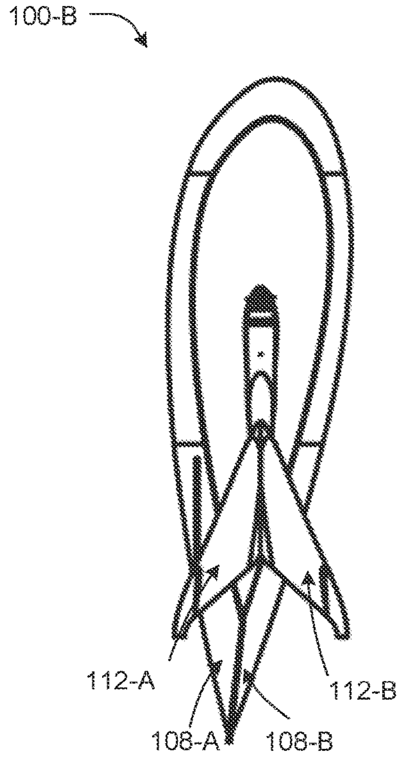
FIG. 1B illustrates a side view of the BWB tailsitter UAV with flaps closed, in accordance with an embodiment of the present subject matter.
Figure 1C:
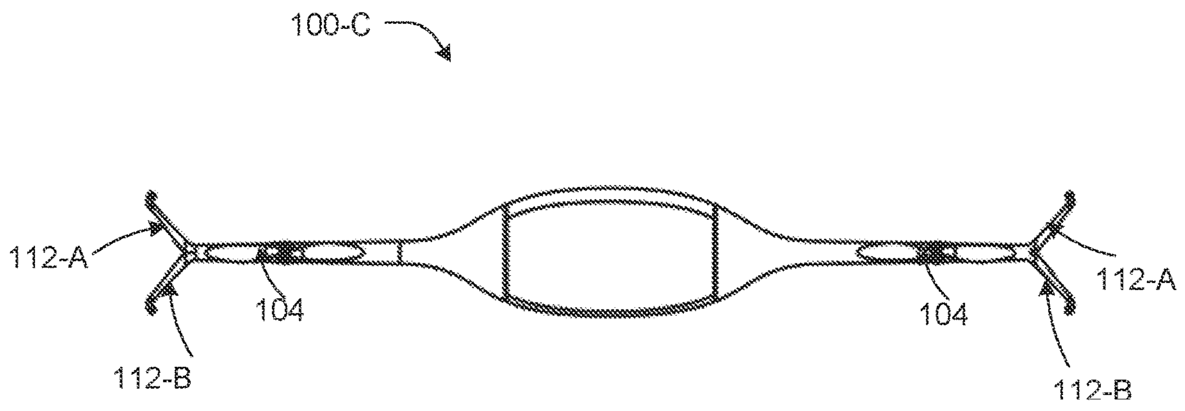
FIG. 1C illustrates a top view of the BWB tailsitter UAV with flaps closed, in accordance with an embodiment of the present subject matter.
Figure 1D:
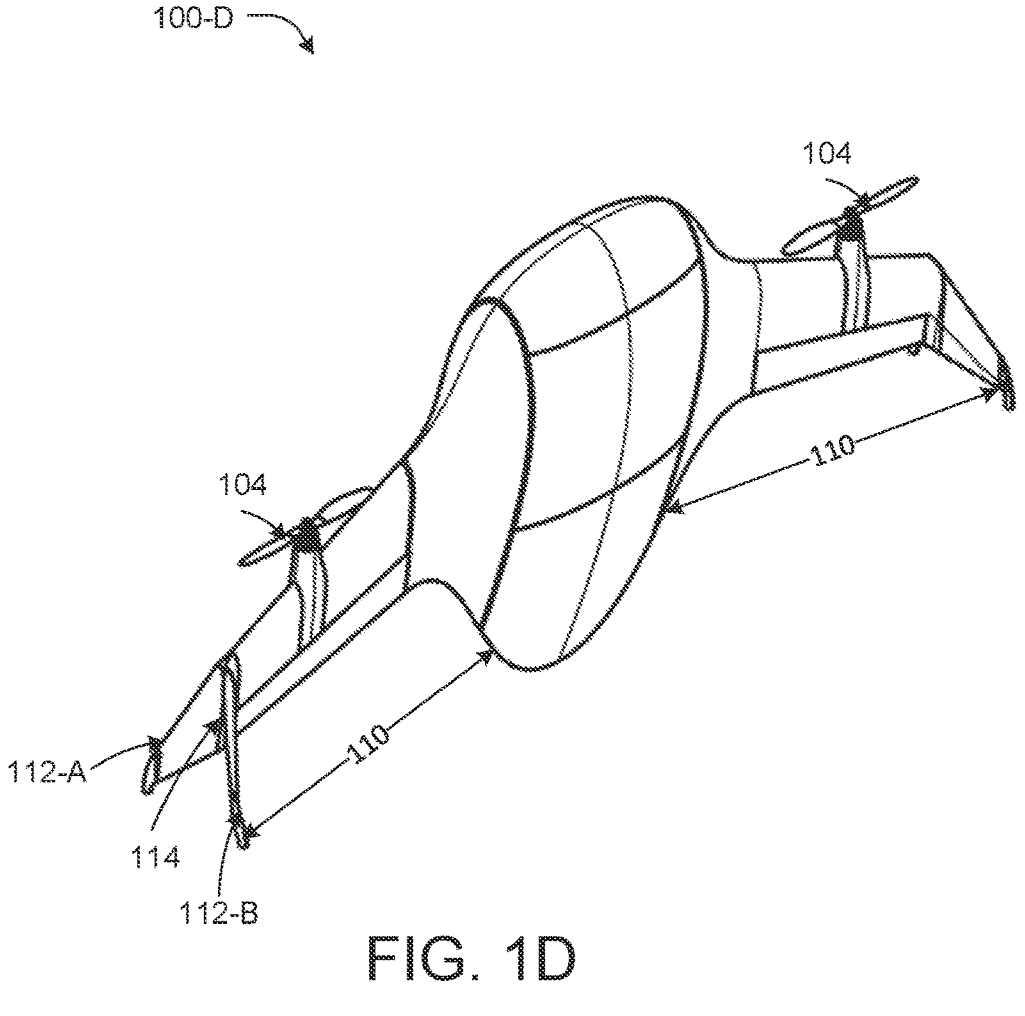
FIG. 1D illustrates an isometric view of the BWB tailsitter UAV with flaps closed, in accordance with an embodiment of the present subject matter.

In some embodiments, the pair of flaps 108-A, 108-B, when in the extended or closed position, protrudes longitudinally beyond a chord of the pair of wings 110 and winglets 112-A, 112-B shown in FIG. 1D. The pair of flaps 108-A, 108-B is configured to be in the extended position or closed position when the UAV 100 is in the horizontal position. In some embodiments, when there is a heavy wind or air flow while the UAV 100 is flying i.e., in the horizontal position, the pair of flaps 108-A, 108-B are configured to be in the retracted position or open position to provide stability to the UAV 100. In some embodiments, the pair of flaps 108-A, 108-B may be hinged to the BWB frame and the positioning of the pair of flaps 108-A, 108-B may be controlled by one or more servo motors. In an exemplary embodiment, the pair of flaps 108-A, 108-B open during the vertical take-off and close before transitioning to the horizontal flight and remain closed during the horizontal flight.

In some embodiments, the flaps 108-A, 108-B serve to create an opening in the UAV 100, facilitating the securement and release of payload or cargo within the BWB frame. The payload or cargo may be secured using a latch mechanism, including, but not limited to, draw latches, magnetic latches, gravity latches, cam latches, rim latches, slam latches, slide latches, flat latches, or hooks. Remote operation of the pair of flaps 108-A, 108-B, for opening and closing, can be achieved by controlling one or more servo motors connected to the flaps 108-A, 108-B.

In an exemplary embodiment, the UAV 100 may be powered with a 6S battery. The battery may include, such as but not limited to, Nickel Cadmium (NiCad), Lithium polymer (LiPo), and Lithium-ion (Li-ion) batteries. In some embodiments, when the drone or UAV 100 is powered off, the flaps 108-A, 108-B may be operated manually.

Referring to FIG. 1A, the pair of wings 110 or wings 110 include symmetrical split scimitar wings. The wings 110 provide both structural and functional support to the UAV 100. In some embodiments, each wing in the pair of wings 110 include identical lower and upper winglets 112-A, 112-B of FIG. 1B, wherein the lower winglet 112-A of FIG. 1B may be coupled to the upper winglet 112-B of FIG. 1B at a tip of the wing. In some embodiments, the ends of the lower 112-A and upper winglets 112-B are utilized to provide a surface that can handle the weight of the aircraft 100. The wing surface may be monocoque, with an internal frame providing a rib and spar structure.

In some embodiments, the BWB frame and the pair of wings 110 may be manufactured from a composite monocoque. For example, the monocoque may consist of a fiber-reinforced plastic (FRP), such as carbon fiber, aramid, or fiberglass, in a resin matrix. In some embodiments, the monocoque may be supported by an internal structure including ribs and spars, wherein ribs and spars provide enhanced rigidity to the monocoque. In some embodiments, some portions of the monocoque and the internal structure may be manufactured with sandwich panels. The sandwich panel may include a lightweight core and a rigid panel. The rigid panel may be either on one side of the lightweight core or on both the sides of the lightweight core. In an example embodiment, the lightweight core may include Nomex or foam and the rigid panel may include balsa wood.

Referring to FIG. 1A, the UAV 100 includes the functionality of a tailsitter aircraft during a take-off and landing. Therefore, the BWB frame combined with the functionalities of the tailsitter aircraft provides the UAV 100 with capabilities to deliver goods or packages for long distances.

In some embodiments, the range of delivery or delivery range R of the UAV 100 may be determined based on the following formula:

$$R = E^{*} \cdot \eta_{total} \cdot \frac{1}{g} \cdot \frac{L}{D} \cdot \frac{m_{battery}}{m},$$

wherein E* is the energy per mass of the battery, $\eta_{total}$ is the total efficiency (for batteries, motor, gearbox and propeller), g is the acceleration due to gravity (9.81 m/sec$^2$), $$\frac{L}{D}$$

defines the lift by drag ration of the UAV 100, $m_{battery}$ defines the mass of the battery, and m defines the total mass of the UAV 100.

In an exemplary embodiment, an UAV 100 weighing 2.5 Kgs using a 5 AH 21700 lithium-ion battery in a 3s 2p configuration, and having a lift to drag (L/D) ratio of 11.8 provides a delivery range of approximately 171.8 Kms.

FIG. 1B illustrates a side view 100-B of the BWB tailsitter UAV 100 with flaps closed, in accordance with an embodiment of the present subject matter.

Referring to FIG. 1B, the side view 100-B of the UAV 100 with lower winglet 112-A and upper winglet 112-B is shown. The lower and upper winglets 112-A, 112-B, are identical and may be attached to the pair of wings 110 at the wing tip 114 as shown in FIG. 1D. The winglets 112-A, 112-B provide structural and functional support to the UAV 100. During the take-off and landing, at least sixty percent of the total weight of the UAV 100 is supported by the winglets 112-A, 112-B. Further, the wings 110 and the winglets 112-A, 112-B form a symmetrical split scimitar wing pattern. This pattern reduces the air drag experienced by the wings 110 during a horizontal flight i.e, when the UAV 110 is flying in the horizontal position, and hence enables the UAV 100 to have longer delivery ranges. For example, the UAV 100 may be used for delivering blood packets in rural areas, where other modes of delivery fail due to the distance and poor infrastructure for connectivity.

FIG. 1C illustrates a top view 100-C of the BWB tailsitter UAV 100 with the pair of flaps 108-A, 108-B closed, in accordance with an embodiment of the present subject matter.

Referring to FIG. 1C, the pair of wings 110 with the winglets 112-A and 112-B, in the split scimitar configuration is shown.

FIG. 1D illustrates an isometric view 100-D of the BWB tailsitter UAV 100 with the pair of flaps 108-A, 108-B closed, in accordance with an embodiment of the present subject matter.

Referring to FIG. 1D, the pair of wings 110 in the split scimitar configuration is shown. Each wing of the pair of wings 110 includes the winglets 112-A and 112-B, wherein the winglets 112-A and 112-B are connected to each other at the wing tip 114. The winglets 112-A and 112-B are identical in shape and size forming a symmetrical split scimitar configuration. Referring to FIG. 1D, the pair of flaps 108-A, 108-B in the closed position or the extended position protrudes longitudinally beyond a chord of the pair of wings 110 and the winglets 112-A, 112-B. In other words, when the aircraft is in a vertical flight mode, the pair of flaps is in the extended position. The pair of flaps protrudes vertically below the winglets or any other landing gear. The chord of a wing and a winglet may be defined as the respective longitudinal length of the wing and the winglet along the length of the BWB frame.

Figure 2A:
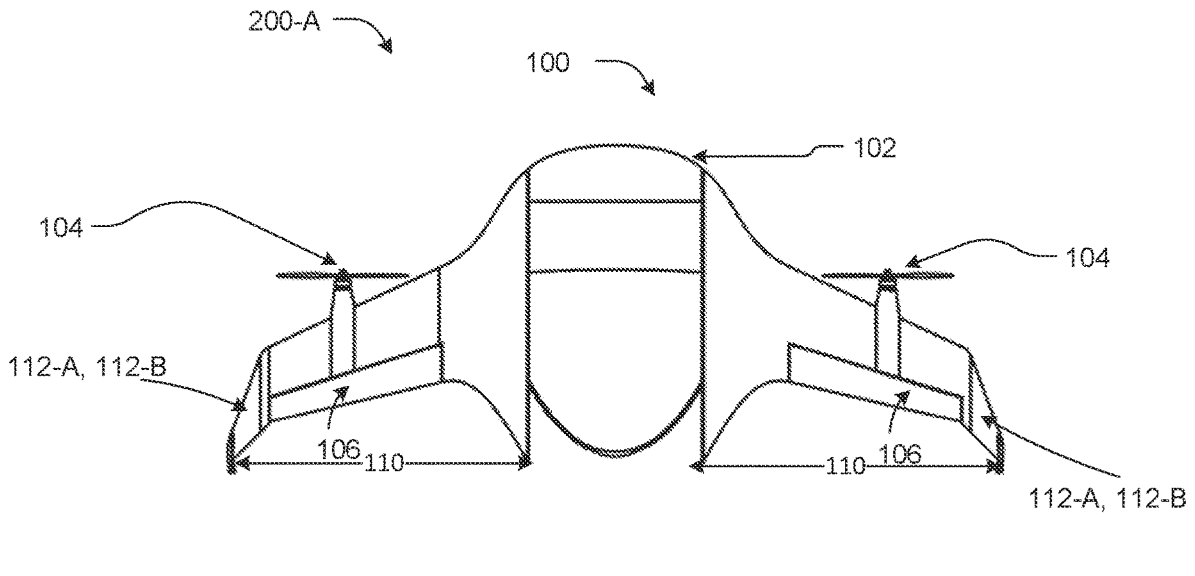
FIG. 2A illustrates a front view of a BWB tailsitter UAV with flaps open (retracted), in accordance with an embodiment of the present subject matter.

FIG. 2A illustrates a front view 200-A of a BWB tailsitter UAV 100 with flaps open, in accordance with an embodiment of the present subject matter.

Referring to FIG. 2A, the pair of flaps 108-A, 108-B open up to the inner space of the BWB frame to enable placing of cargo. In some embodiments, the cargo may be secured by a latch mechanism inside the BWB frame. Upon securing the cargo, the pair of flaps 108-A, 108-B may remain open for providing stability during the vertical take-off process and may close just before transitioning to the horizontal flight and remain closed during the flight. The pair of flaps 108-A, 108-B may again open when the UAV 100 reaches the required destination. The opening of flaps 108-A, 108-B enables the delivery of the cargo and also helps in the landing process of the UAV 100. In some embodiments, the UAV 100 may land at the destination with full payload where flaps 108-A, 108-B open to release the cargo upon landing at the destination.

In some embodiments, the cargo may be released during mid transition and the UAV 100 may land with no cargo. In some embodiments, the UAV 100 may deliver cargo at a plurality of destinations and return back to the base station. For example, the UAV 100 may initially be in a horizontal flight and upon reaching a first destination, the UAV 100 transitions from the horizontal flight to a vertical flight for a short duration of time, opens the pair of flaps 108-A, 108-B, and drops the cargo. The UAV 100 then continues back to horizontal flight to a second destination, thereby deliver cargo at multiple destinations.

Figure 2B:
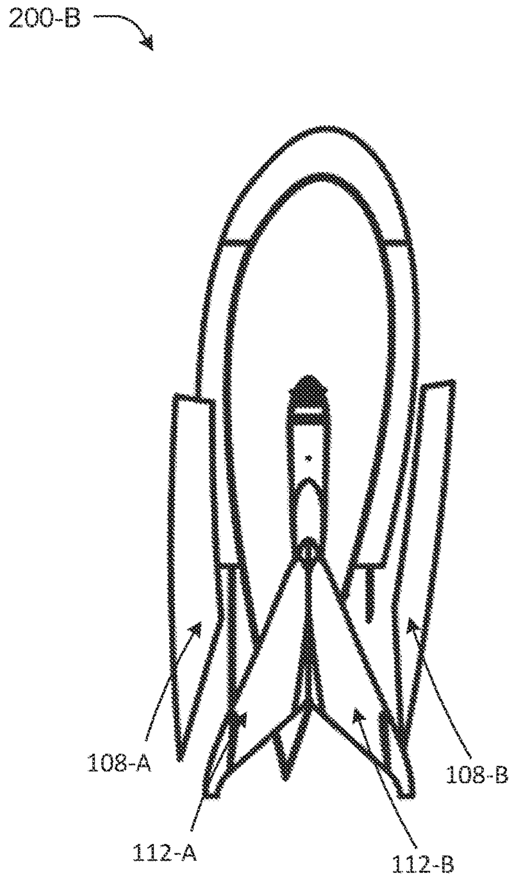
FIG. 2B illustrates a side view of the BWB tailsitter UAV with flaps open, in accordance with an embodiment of the present subject matter.

FIG. 2B illustrates a side view 200-B of the BWB tailsitter UAV 100 with the pair of flaps 108-A, 108-B open, in accordance with an embodiment of the present subject matter.

Figure 2C:
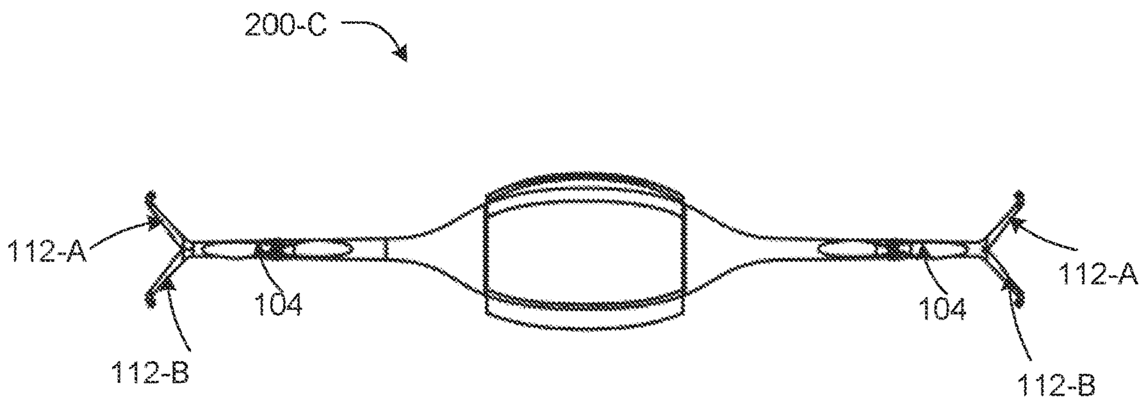
FIG. 2C illustrates a top view of the BWB tailsitter UAV with flaps open, in accordance with an embodiment of the present subject matter.

FIG. 2C illustrates a top view 200-C of the BWB tailsitter UAV 100 with the pair of flaps 108-A, 108-B open, in accordance with an embodiment of the present subject matter.

Figure 2D:
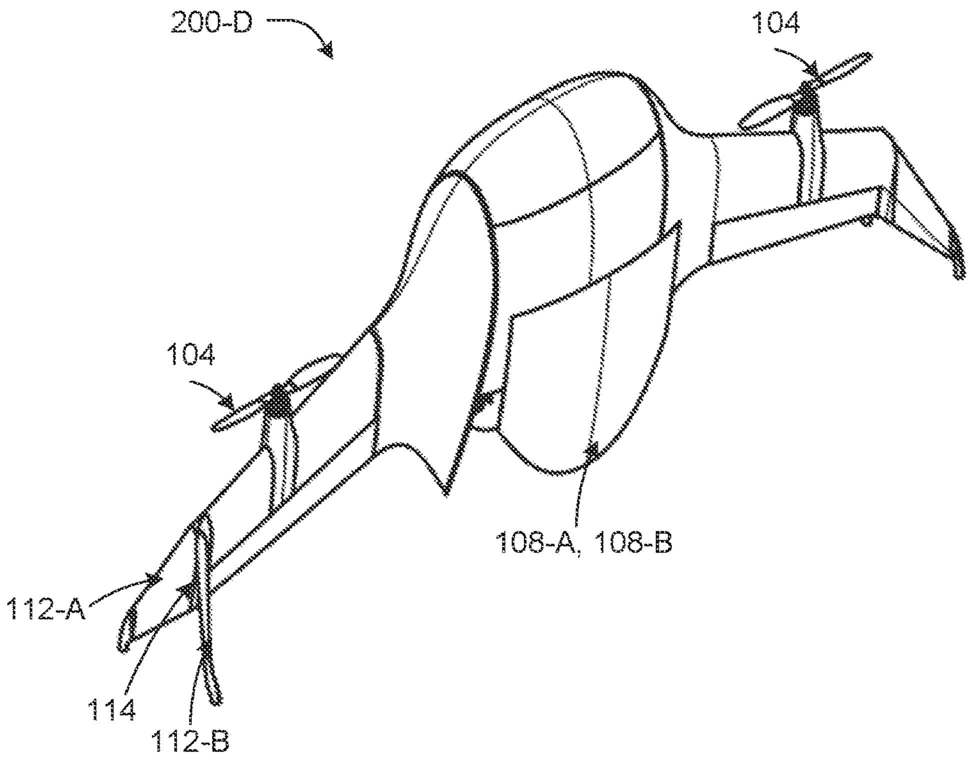
FIG. 2D illustrates an isometric view of the BWB tailsitter UAV with flaps open, in accordance with an embodiment of the present subject matter.

FIG. 2D illustrates an isometric view 200-D of the BWB tailsitter UAV 100 with the pair of flaps 108-A, 108-B open, in accordance with an embodiment of the present subject matter.

Figure 3:
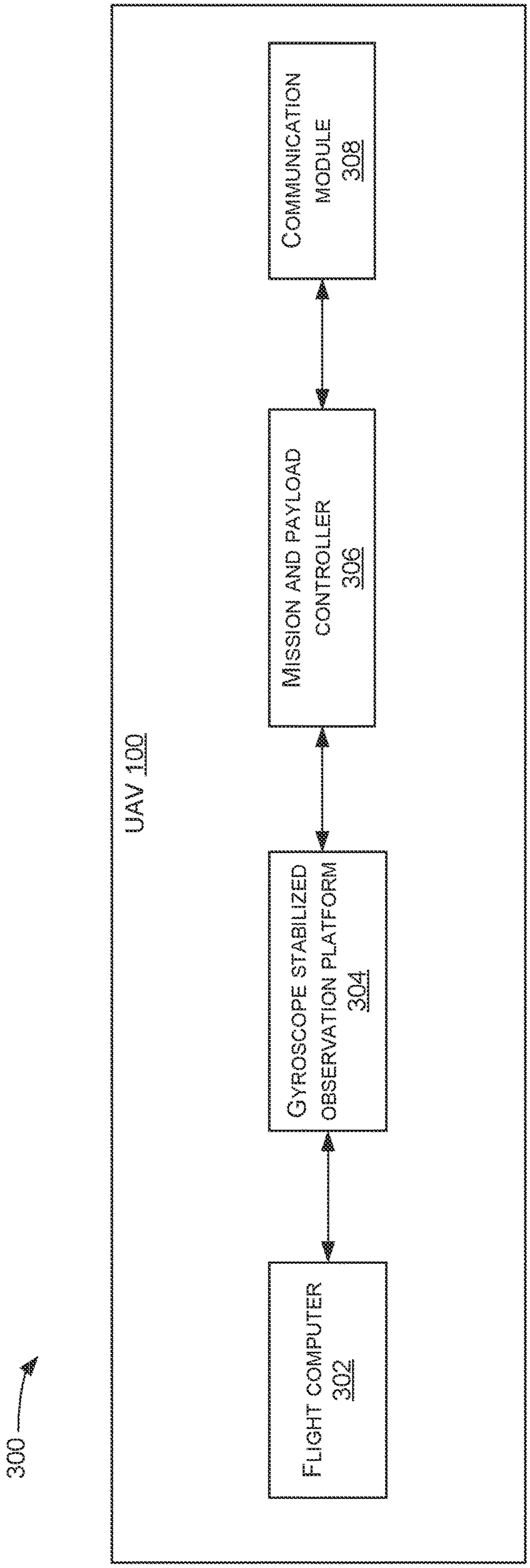
FIG. 3 illustrates a functional block diagram of the BWB tailsitter UAV, in accordance with an embodiment of the present subject matter.

FIG. 3 illustrates a high-level functional block diagram of the BWB tailsitter UAV, in accordance with an embodiment of the present subject matter.

Referring to FIG. 3, the UAV 100 including a flight computer 302, a gyroscope stabilized observation platform 304, a mission and payload controller 306, and a communication module 308 is shown. In some embodiments, the flight computer 302 guides the UAV 100 to its next waypoint based on at least static and dynamic pressure information from an Air Data System and roll, pitch, and yaw data information from an Attitude and Heading Reference System (AHRS). The flight computer 302 may also operate UAV 100 payloads and enable communication with a base station or a ground control station.

The flight computer 302 serves as the central processing unit, managing and controlling various aspects of the UAV's flight, navigation, and overall operation. The flight computer 302 processes data from sensors, guides the UAV 100 during flight, and executes flight plans. The Gyroscope-Stabilized Observation Platform 304 enhances stability and provide a steady observation platform, ensuring accurate data collection and payload deployment. It helps stabilize the UAV's observation capabilities, especially during observation or surveillance missions. The mission and payload controller 306 is responsible for managing specific mission tasks and controlling the payload attached to the UAV 100. It ensures that the UAV 100 executes its designated mission tasks and oversees the deployment and operation of any attached payloads.

Further, the communication module 308 may facilitate communication between the UAV 100 and a base station (not shown), enabling data exchange, control signals, and status updates. The communication module 308 may comprise different communication technologies, including mobile and satellite communication modules, including fourth-generation (4G), fifth-generation (5G), or sixth-generation (6G) communication modules. Mobile communication is suitable for areas with cellular coverage, providing high-speed data transmission and low-latency communication. The satellite communication module may be useful in regions where mobile communication is unavailable, as it ensures continuous communication and control. The satellite communication module allows the UAV to operate in remote or isolated areas with limited ground-based communication infrastructure.

Figure 4:
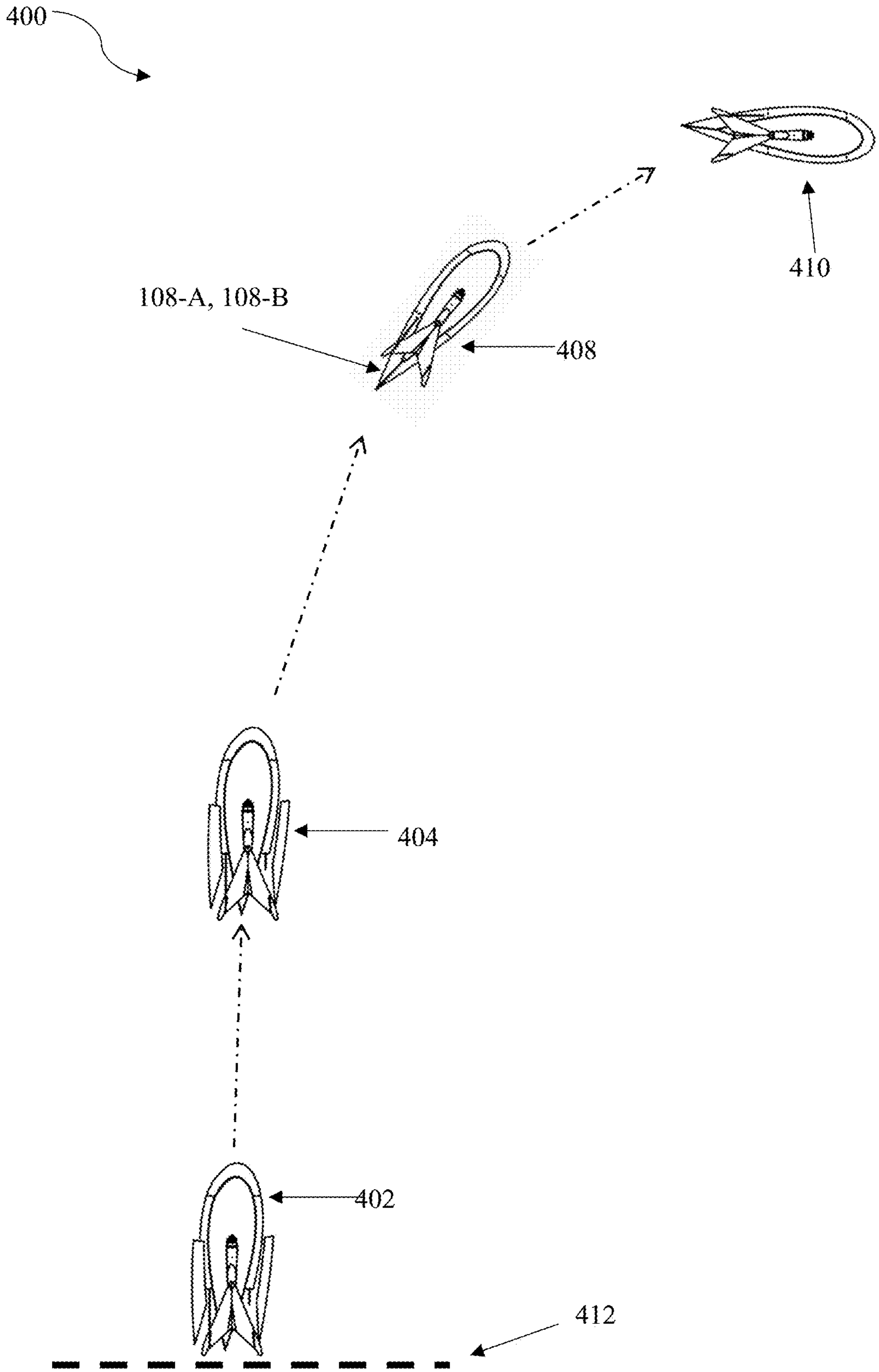
FIG. 4 illustrates a take-off phase of the BWB tailsitter UAV, in accordance with an embodiment of the present subject matter.

FIG. 4 illustrates a vertical take-off of the BWB tailsitter UAV 100, in accordance with an embodiment of the present subject matter.

Referring to FIG. 4, the vertical take-off 400 illustrates the different positions of the UAV 100 when transitioning from the vertical position on the ground 412 to the horizontal position for flight. In an exemplary embodiment, the UAV 100 at a first position 402 may stand vertically on the ground 412 by resting on the winglets 112-A and 112-B and having the pair of flaps 108-A, 108-B open or retracted. The UAV 100, at the first position 402 is in the tailsitter configuration and takes off like a rocket in a vertical direction. In the exemplary embodiment, the pair of flaps 108-A and 108-B remain open until the UAV 100 achieves a certain height of 408 (after transitioning from 404) to the horizontal flight 410. The pair of flaps 108-A, 108-B closes while the UAV 100 transitions 408 to the horizontal flight 410. In some embodiments, the UAV 100 rotates about its pitch axis to achieve the transition from the vertical position to the horizontal position.

In another embodiment, the UAV 100 may close the flap post, transitioning from a vertical position to a horizontal position. In yet another embodiment, the UAV 100 may close the pair of flaps as soon as the UAV 100 initiate vertical flight.

Figure 5:
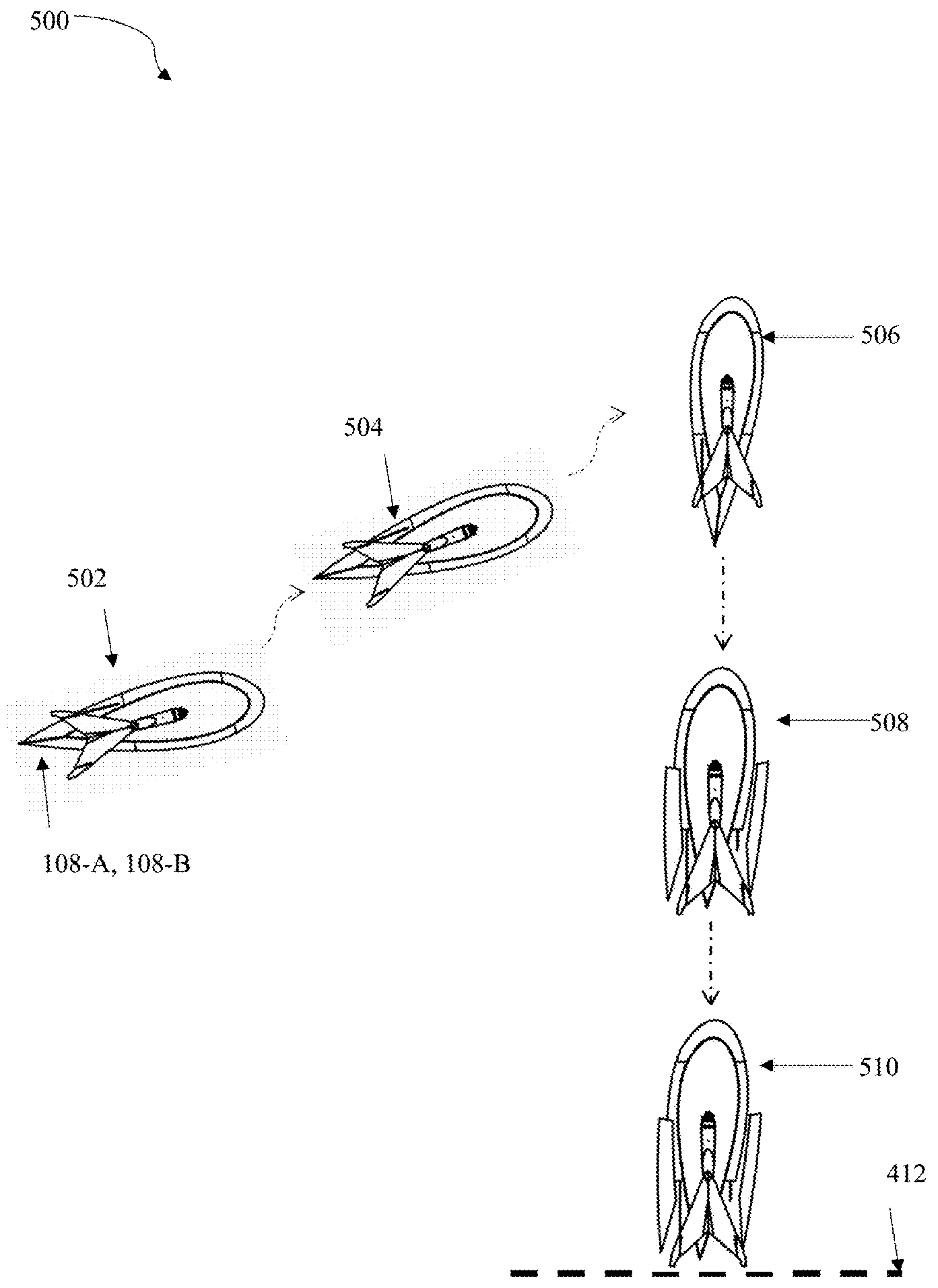
FIG. 5 illustrates a landing phase of the BWB tailsitter UAV, in accordance with an embodiment of the present subject matter.

FIG. 5 illustrates a vertical landing of the BWB tailsitter UAV, in accordance with an embodiment of the present subject matter.

Referring to FIG. 5, the landing phase 500 illustrates the different positions of the UAV 100 when transitioning from a horizontal flight to a vertical landing on the ground. In some embodiments, the UAV 100, while in horizontal flight 502, may have the pair of flaps 108-A, 108-B closed or extended. Instances 502, 504, and 506 show that the pair of flaps 108-A and 108-B is closed. Further, Instances 508 and 510 show that the pair of flaps open or retracts before the UAV touches the ground 412. The pair of flaps 108-A, 108-B in the open position provide ground clearance for the vertical landing 510. The UAV 100 lands on the ground in the tailsitter configuration by sitting vertically on the winglets 112-A, 112-B.

In other scenarios, the UAV 100, after transitioning from horizontal flight mode to vertical flight mode may retract the pair of flaps for better landing of the aircraft 100.

The advantages of the various embodiments include a higher range of delivery due to the BWB frame. The BWB frame provides the majority of the lift needed by the drone or the UAV 100, thereby reducing the form drag associated with larger wings for a longer flight range. Further, the use of flaps 108-A, 108-B during take-off and landing also enables the reduction of wing size. The design of the wings 110 as symmetrical split scimitar wings reduces the air drag on the wings 110 and enables the UAV 100 to travel longer distances.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

The invention claimed is:

1. An aircraft comprising:

an airframe including two or more propellers; a pair of wings; and a fuselage integrated with the pair of wings to create a Blended Wing Body (BWB) structure having a smoothly blended shape between the fuselage and the pair of wings, wherein the airframe transitions in flight between a vertical flight mode and a horizontal flight mode, wherein the BWB structure is designed such that over fifty percent of lift is generated from the fuselage of the BWB structure to allow for a reduction of a size of the pair of wings with respect to a size of the fuselage.

2. The aircraft of claim 1, wherein the pair of wings comprises split scimitar wmgs.

3. The aircraft of claim 1 further comprises a pair of flaps coupled to the fuselage, wherein the pair of flaps is designed to facilitate at least one of take-off, landing, cargo securement, and a cargo release operation.

4. The aircraft of claim 1, further comprises a plurality of elevons, wherein rotations of the propellers control the plurality of elevons to generate a thrust vector to maintain a stability of the aircraft and transitioning the aircraft from a vertical position to a horizontal position.

5. The aircraft of claim 3, wherein the pair of flaps exhibits two positions, comprising an extended position and a retracted position.

6. The aircraft of claim 5, wherein the pair of flaps is configured to be in the retracted position during take-off and landing, ensuring ground clearance during landing and maintaining a spaced-apart position to prevent contact between the flaps.

7. The aircraft of claim 5, wherein the pair of flaps, when in the extended position, protrudes vertically below the pair of wings.

8. The aircraft of claim 6, wherein the pair of flaps is configured to be in the extended position when the aircraft is in a horizontal position.

9. The aircraft of claim 5, wherein positions of the pair of flaps is controlled by a linkage connected to one or more servo motor.

10. The aircraft of claim 1 is further configured to function as a tailsitter during vertical take-off and landing.

11. The aircraft of claim 1, wherein a wing of the pair of wings comprises a lower winglet and an upper winglet, wherein the lower winglet and the upper winglet are identical, and the lower winglet is attached to the upper winglet at a tip of the wing.

12. The aircraft of claim 11, wherein the lower winglet and the upper winglet carry at least sixty percent of a total weight of the aircraft in a vertical position.

13. The aircraft of claim 1, wherein the two or more propellers comprise a torque multiplier, wherein the torque multiplier is controlled by one or more servo motors.

14. An airframe for an aircraft, the airframe comprising:

a fuselage integrated with a pair of wings to create a Blended Wing Body (BWB) structure; and a pair of flaps coupled to the fuselage, wherein the pair of flaps is designed to facilitate at least one of take-off, landing, cargo securement, and a cargo release operation, wherein the pair of flaps exhibits two positions, comprising an extended position and a retracted position, and wherein the pair of flaps is configured to be in the retracted position during take-off and landing, ensuring ground clearance during landing and maintaining a spaced-apart position to prevent contact between the flaps; and two or more propellers, wherein the airframe transitions in flight between a vertical flight mode and a horizontal flight mode.

15. The airframe of claim 14, wherein a wing of the pair of wings comprises:

a lower winglet and an upper winglet, wherein the lower winglet and the upper winglet are identical, and the lower winglet is attached to the upper winglet at a tip of the wing.

16. The airframe of claim 14, further comprise a plurality of elevons coupled to the airframe.

17. The airframe of claim 14 is further constructed from a composite monocoque, utilizing fiber-reinforced plastic (FRP) materials like carbon fiber, aramid, or fiberglass embedded in a resin matrix.

18. The airframe of claim 17, wherein the composite monocoque is reinforced by an internal structure comprising ribs and spars to improve rigidity.

19. An airframe for an aircraft, the airframe comprising:

a fuselage integrated with a pair of wings to create a Blended Wing Body (BWB) structure; and a pair of flaps coupled to the fuselage; and two or more propellers, wherein the airframe transitions in flight between a vertical flight mode and a horizontal flight mode, wherein the BWB structure is designed such that over fifty percent of lift is generated from the fuselage of the BWB structure.

20. The airframe of claim 19, wherein the pair of flaps is designed to facilitate at least one of take-off, landing, cargo securement, and a cargo release operation, wherein the pair of flaps exhibits two positions, comprising an extended position and a retracted position, and wherein the pair of flaps is configured to be in the retracted position during take-off and landing, ensuring ground clearance during landing and maintaining a spaced-apart position to prevent contact between the flaps.

* * * * *